2,778,863
TREATMENT OF AROMATIC AND UNSATURATED DISTILLATES

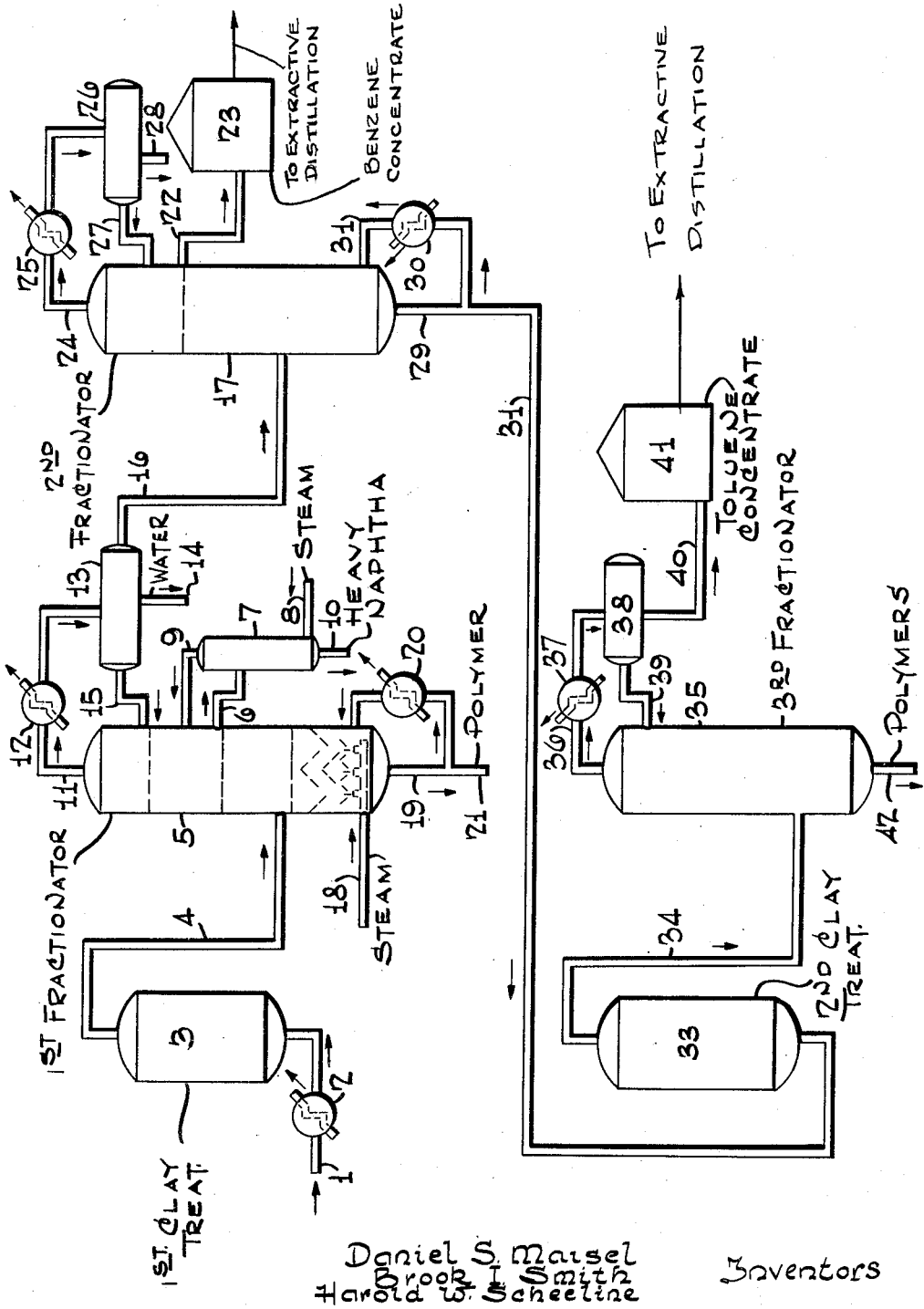

Daniel S. Maisel, Union, and Brook I. Smith and Harold W. Scheeline, Elizabeth, N. J., assignors to Esso Research and Engineering Company, a corporation of Delaware Application March 19, 1952, Serial No. 277,486

4 Claims. (Cl. 260—674)

The present invention relates to improvements in successive clay treating and fractionation operations imposed on aromatic and highly unsaturated naphtha distillates for the production of valuable polymers from unsaturated components while recovering separate benzene and toluene concentrates suitable for extractive distillation.

Severe thermal cracking of gas oil or heavy naphtha fractions, preferably in the presence of steam, produces naphtha distillates having high contents of olefinic hydrocarbons and aromatic hydrocarbons. Various processes directed toward complete removal of the diolefins from these distillates were investigated because the diolefins, in general, were considered to have an adverse effect in the extractive distillation purification of the aromatic components.

Operations of clay treating units for removing diolefins from aromatic distillates were not satisfactory, due chiefly to fouling of the clay by formation of tarry polymers having undesirable qualities.

Substantial revisions, made in accordance with the present invention, have been successful in greatly reducing the fouling of the clay, improving the quality and recovery of polymer and for obtaining appropriate aromatic concentrates suitable for extractive distillation with the various solvents such as phenolic solvents, furfural, triethylene glycol, etc.

The main improvement features of the present invention are as follows:

(a) Operation of an initial mild clay treatment to which the naphtha distillate is subjected substantially in the liquid phase so that only a portion of the diolefinic components that are most reactive form polymers and the polymers as they are formed are removed from the clay continuously by the remaining unpolymerized liquid components of the distillate. By this improved operation the clay bed run lengths are extended from an earlier life period of 8–15 days to life periods of 40–60 days and the yield of high quality polymer is enhanced.

(b) The clay treated aromatic distillate carrying along the polymer washed from the clay is subjected to a steam distillation for separating the polymer as a bottoms product, and fractionation for removal of a heavy naphtha fraction as a side stream product during recovery of light naphtha overhead distillate containing substantially all of the benzene and toluene.

(c) The light aromatic distillate separated from water is subjected to a second fractionation to obtain a suitable benzene concentrate that needs no further treatment prior to extractive distillation and into a toluene fraction. The toluene fraction, however, is subjected to a second clay treatment under mild conditions similar to the initial clay treatment to form additional polymer which is separated by further fractionation in the absence of water vapor. This fractionation to recover additional polymer from the second clay treatment gives the toluene distillate a more finely adjusted end point.

The features of this invention will be described in greater detail with reference to the accompanying drawing, which shows schematically the flow plan for a preferred arrangement of process means.

In the drawing, the naphtha feed containing largely unsaturated hydrocarbons with 20 to 30 volume percent of aromatics is passed from line 1 through preheating means 2 into the clay treating drum 3. It is advantageous to pass the liquid naphtha upwardly through the clay bed for more effective liquid-with-clay contacting, but alternatively the liquid naphtha may be passed downwardly through the clay. The effluent treated naphtha hydrocarbons carrying in solution the polymers formed from the reactive diolefins is passed from the clay treating drum 3 through line 4 into an intermediate part of the fractionating column 5. About five plates above the feed inlet point, a side stream of heavy naphtha is withdrawn by line 6 to a stripper 7, at the bottom of which is introduced steam from line 8 for stripping light naphtha components. The light naphtha components vaporized at about 290°–320° F. in the stripper 7 are returned a few plates above the point at which the side stream is removed by line 9. Stripped heavy naphtha at 260°–420° F. boiling range is withdrawn by line 10. The light naphtha vapors including substantially all of the benzene and toluene, are taken overhead by line 11 to a cooling condenser 12.

The aqueous overhead distillate is run from condenser 12 into a receiver 13, where a bottom water phase is separated to be removed by line 14. Some of the upper hydrocarbon phase distillate is returned as reflux through line 15 at about the 16th plate above the feed inlet. The remaining light naphtha overhead distillate separated from water in receiver 13 is passed by line 16 to the next fractionating column 17.

For satisfactory distillation in column 5, i. e., for collecting the polymers as a finished bottoms product and taking overhead substantially all benzene and toluene, it is important to supply large amounts of steam as a stripping agent, e. g. by line 18 as well as by line 8. The total steam supplied to column 5 amounts to about 5 to 20 wt. percent of the hydrocarbon feed, including steam used in the side stream stripper 7, the latter being at least about ⅓ to ½ of the total used. With these amounts of steam in column 5, the bottoms polymer product is prevented from being decomposed by overheating while it is stripped free of original naphtha components. Some of the polymer bottoms is withdrawn by line 19 through the reboiler 20 to supply additional heat for the distillation at temperatures of 380°–420° F. The final bottoms polymer is withdrawn by line 21. In the second fractionating column 17, the feed inlet plate is about 15 plates above the bottom to provide a stripping action in which the toluene cut is substantially freed of benzene and any dissolved water.

A benzene cut free of toluene is withdrawn at about 20 plates above the feed inlet plate through line 22. The benzene cut withdrawn will contain no more than a trace of water and may be sent directly to storage tank 23 prior to a subsequent extractive distillation for purification. This benzene cut needs no further treatment prior to extractive distillation.

The overhead vapors from column 17 contain hydrocarbons boiling up to 165° F. with a slight amount of water vapor and are passed by line 24 through a cooling condenser 25 to supply reflux condensate which is returned from receiver 26 to column 17 by line 27 at about 25 or 30 plates above the feed inlet plate. The overhead distillate boiling below 165° F. will contain less than 3% benzene with certain diolefins preferred to be removed from the system by line 28.

The second fractionator serves to dry the aromatic concentrates while making the precise cuts desired. The bottoms toluene fraction is withdrawn from column 17 by line 29. A portion of the bottoms may be recycled through a heat exchange reboiler 30 and line 31 to supply heat needed in column 17.

The toluene-rich bottoms from column 17 is passed by line 31 into a bottom part of the second clay treating drum 33, wherein the toluene fraction is treated under conditions similar to those used in the first treating drum 3. Here again, the clay treated toluene-rich hydrocarbons wash away polymers formed during the second clay treatment; and the effluent liquid hydrocarbons containing the polymers are passed by line 34 into the third fractionator or rerun column 35 about four plates above the bottom. The toluene concentrate distillate is drawn overhead from column 35 through line 36 to a cooling condenser 37; then into receiver 38. A portion of the overhead distillate is returned by line 39 as reflux to a top plate which is about the 10th–14th plate above the feed inlet. The remaining portion of the overhead distillate is sent by line 40 to storage tank 41 for subsequent purification operations. The polymers derived from the second clay treatment are withdrawn as a bottoms product from column 29 through line 42.

The initial feed stock suitable for the treatment is a debutanized cracked naphtha boiling in the range of from about 120° F. to 420° F. with the following kind of composition:

*Table I.—Naphtha feed*

| Components: | Volume percent |
|---|---|
| Paraffins | 2– 5 |
| Olefins | 45–70 |
| Benzene | 10–15 |
| Toluene | 10–15 |
| Diolefins | 10–20 |

Such cracked naphthas are produced by cracking gas oil or heavy naphtha in the presence of 75–90 mole percent steam under a low total pressure of 15 to 45 p. s. i. g. at temperatures ranging from 1050° to 1400° F. in a short period of a few seconds. The resulting cracked naphtha product after condensation is freed of at least $C_4$ and lower boiling hydrocarbons, but may also be freed of $C_5$ hydrocarbons in order to lower the vapor pressure of the remaining naphtha hydrocarbons to be clay treated in liquid phase.

The proper treating conditions for the liquid phase naphtha in the first clay treating drum 3 are as follows:

Temperature, 250° F.–350° F.
Feed Rate, 0.25–10 v./v./hr. (vol. of liquid/vol. of clay/hr.).
Pressures, 70–200 pounds per square inch gauge.

The main requirements in treating such a wide boiling naphtha fraction with clay so that the polymers formed are extracted and washed away from the clay are:

(1) The hydrocarbons contacted with the clay, under the conditions of contact, must remain substantially in the liquid phase, preferably with a maximum temperature of 350° F. Under these conditions approximately only about half the diolefins become polymerized, but the unreacted components of the feed stock are then in sufficient quantity to extract and carry away the polymers as they are formed. This initial clay treatment is carried out primarily to form polymers that suitably meet specification requirements. More intense polymerization of the diolefins at this stage is adverse to the quality of the polymer and causes fouling of the clay.

The effluent liquid withdrawn from the clay treating drum 3 by line 4, should have a composition exemplified as follows:

*Table II.—Initial clay treat effluent products*
TOTAL EFFLUENT

| Components | Volume percent |
|---|---|
| Polymer | 5–10 |
| Paraffins | 2– 5 |
| Benzene | 10–20 |
| Toluene | 10–20 |
| Olefins | 45–70 |
| Diolefins | 5–10 |

The effluent from the initial clay treating unit can be made to flow directly into a first fractionating column, column 5, to be fractionated in such a manner that the polymers are recovered as a bottoms product, while the benzene and toluene are taken overhead as a distillate with stripping steam. In this operation of segregating the polymer product, an intermediate fraction boiling in the range of 260°–420° F., and termed a heavy naphtha fraction, is withdrawn as a side stream. To avoid any loss of toluene in the heavy naphtha side stream, this heavy naphtha is stripped with a controlled amount of steam in order to return toluene back to the fractionating column, thus giving the heavy naphtha an initial boiling point of about 260° F. and making the loss of toluene less than .5%.

The polymer bottoms which can be withdrawn from the fractionating column 3 are suitable directly for many uses. For example, these polymers meet specific requirements for use as a rubber extender or as a core oil. They have suitable viscosity and light color.

Satisfactory operating conditions for column 5 in which polymer is segregated from an intermediate heavy naphtha fraction and the light naphtha distillate are as follows:

Top or overhead vapor temperature, 260°–290° F.
Pressure, 40–80 pounds per sq. inch absolute.
Bottoms temperature, 380° F.–460° F.

The light naphtha distillate taken overhead from column 5 should have a final end point in the range of 240° F. and 290° F. and have a composition which comes within the following ranges:

*Table III.—Composition of light naphtha distillate (dry) for splitting into benzene and toluene cuts*

| Components: | Volume percent |
|---|---|
| Paraffins | 1–5 |
| Olefins | 40–60 |
| Benzene | 15–25 |
| Toluene | 15–25 |
| Diolefins | 4–8 |

The light naphtha with a composition above described after removal of as much water as practical by phase separation, can be efficiently split into a benzene concentrate intermediate fraction which is quite suitable for extractive distillation and a toluene bottoms fraction having a properly adjusted end point for further treatment. The splitting between the benzene and toluene fractions is carried out in a second fractionating column 17 which has been termed a "splitter." This column is efficiently operated under a pressure of about 100 p. s. i. g. with a bottom temperature of 380° F. and a top or overhead temperature of about 165° F. With this operation the overhead components will include a small amount of water, less than about 3% benzene, and some diolefins. The hydrocarbon composition of the overhead is typified by the following.

*Table IV.—Splitter overhead*

| Components: | Volume percent |
|---|---|
| Paraffins | 1–3 |
| Olefins | 85–90 |
| Benzene | 1–3 |
| Toluene | 0 |
| Diolefins | 2–10 |

The side stream benzene concentrate containing only a trace of water will have the following type of composition:

Table V.—Benzene concentrate

| Components: | Volume percent |
|---|---|
| Paraffins | 1-5 |
| Benzene | 30-50 |
| Diolefins | 2-8 |
| Olefins | 40-65 |
| Toluene | 0 |

The desired water-free toluene bottoms fraction from the splitter will have a composition as follows:

Table VI.—Splitter bottoms—toluene fraction

[Boiling range 185°–260° F.]

| Components: | Volume percent |
|---|---|
| Paraffins | 1-5 |
| Toluene | 25-45 |
| Benzene | 1-3 |
| Olefins | 45-70 |
| Diolefins | 4-10 |

It is to be noted that the benzene concentrate which has been recovered from the splitter column 17 may contain up to 8% diolefins. Such a benzene fraction can be directly subjected to extractive distillation without excessive detrimental effects by these diolefins. The toluene fraction, however, requires a second clay treatment followed by a rerunning fractionation. Thus, the bottoms toluene fraction from the splitter column 17 is subjected to the second clay treatment by being passed through drum 33 which is operated under conditions similar to the conditions of clay treatment in the initial drum 3, e. g. under 70–200 pounds per square inch gauge and at 250°–350° F., and a liquid flow rate of 0.25 to 10 vols./vol. of clay/hr. With this clay treatment, the effluent from the treated toluene fraction will have the following composition:

Table VII.—Clay treated toluene fraction effluent

| Components: | Volume percent |
|---|---|
| Polymer | 2-8 |
| Paraffins | 1-5 |
| Olefins | 40-65 |
| Diolefins | 1-3 |
| Benzene | 1-3 |
| Toluene | 30-50 |

As in the initial clay treatment, again it becomes necessary to separate the toluene from the polymer that is washed away from the clay and this function is served by the toluene concentrating column 35 operated with a top temperature of about 240°–300° F., under a pressure of 40 p. s. i. g. and with a bottom temperature of about 380° F. The final toluene concentrate is now fully preconditioned for extractive distillation and will have a composition of the following type:

Table VIII.—Final toluene concentrate

[Boiling range 185°–240° F.]

| Components: | Volume percent |
|---|---|
| Paraffins | 1-5 |
| Toluene | 30-50 |
| Benzene | 1-3 |
| Olefins | 40-65 |
| Diolefins | 1-3 |

The details of vapor-liquid extractions or extractive distillations are well-known and need not be discussed at length here.

It is to be noted that the present invention is concerned with the steps to be taken in segregating three main products from a highly cracked naphtha, namely, high quality polymer derivatives of diolefins present in the naphtha, a benzene concentrate suitable for extractive distillation, and a toluene concentrate suitable for extractive distillation. In this process, certain advantages are gained in preconditioning the benzene concentrate while the toluene is also undergoing a partial preconditioning, such as occurs in the initial clay treatment followed by successive fractionation in two columns, the first column being used to segregate a high premium polymer product and intermediate heavy naphtha fraction with the aid of steam, the second column making a split between the desired benzene concentrate and bottoms toluene fraction substantially free of water. With the described treatment, a premium quality polymer is obtained from the more highly reactive diolefins under conditions for lengthening the clay life, using any of the well known polymerizing clays, e. g. activated bentonite, Attapulgus clay, fuller's earth, Superfiltrol, Floridin, etc.

Although the second clay treatment imposed on the liquid toluene cut does not form polymer product of as high quality as the first clay treatment, it has to be controlled for long clay life. The factors contributing to long life of the clay in this second treatment are the narrow boiling range of the toluene fraction treated, the mildness of conditions in the treatment, and quick removal of polymers formed with the liquid hydrocarbons treated. The polymer product separated from the second clay treatment effluent is diluted and fluxed by hydrocarbons boiling above 240° F. to reduce its viscosity.

It is to be understood that modifications may be made without departing from the spirit and scope of the invention. Although the hydrocarbon fractions are preferably maintained in the liquid phase in the clay treatments to obtain extended life of the clay, the hydrocarbon fractions may be in a mixed-vapor phase or in vapor phase in each of the clay treatments while making use of the first fractionator and second fractionator as described.

When subjecting the hydrocarbon fractions in a mixed phase or vapor phase to the clay treatments, the temperature of the clay may be in the range of 250° F. to about 500° F. and the hydrocarbons may be passed more rapidly through the clay treating zone as the temperature is raised.

In any event, the clay treated hydrocarbons have to be separated from the resulting polymers formed in the first clay treating zone by using steam in the first fractionating zone where the polymers are removed as a bottoms product. It thus becomes important to eliminate water condensed from the steam so that in the subsequent fractionation for segregating the aromatic concentrate fractions, either the $C_6$ aromatic or $C_7$ aromatic concentrate, these fractions are kept substantially free of water.

What is claimed is:

1. In a process for segregating $C_6$ and $C_7$ aromatic hydrocarbon concentrates suitably freed of reactive diolefins for extractive distillation from a naphtha containing mainly olefinic and aromatic hydrocarbons, the steps which comprise contacting said naphtha in liquid phase with clay at 250° F. to about 500° F.; passing the clay-treated naptha and resulting polymers of reactive diolefins from the clay into a first fractional distillation zone; distilling a light distillate portion of the clay-treated naphtha hydrocarbons containing the aromatic hydrocarbons to be segregated from said polymers with added steam in said first distillation zone; substantially freeing the light distillate of water; passing the said light hydrocarbon distillate substantially free of water into a second fractional distillation zone; separating in said second fractional distillation zone concentrates of $C_6$ and $C_7$ aromatic hydrocarbons, the $C_6$ aromatic concentrate being a water-free distillate boiling in the range of 165° to 185° F.; then subjecting said $C_6$ aromatic concentrate to an extractive distillation to recover purified benzene.

2. In a process for segregating a benzene concentrate suitably freed of reactive diolefins for extractive distillation from a cracked naphtha containing mainly olefinic and aromatic hydrocarbons, the steps which comprise contacting a fraction of the naphtha boiling in the range of about 120° F. to 420° F. with clay at 250° F. to 350°

F.; maintaining the naphtha in liquid phase to remove polymers from the clay; passing the clay-treated naphtha and polymers into a first fractional distillation zone; distilling a light hydrocarbon distillate portion of the naphtha hydrocarbons boiling from about 120° F. to at least 200° F. with steam from said distillation zone; separating undissolved water from said light hydrocarbon distillate; fractionally distilling the light hydrocarbon distillate in a second fractional distillation zone to remove overhead dissolved water with hydrocarbons that boil up to 165° F.; withdrawing as an intermediate cut from said second fractional distillation zone a water-free benzene concentrate fraction that boils in the range of 165° F. to 185° F., and a bottoms cut containing hydrocarbons boiling above 185° F.; then subjecting said benzene concentrate to a subsequent extractive distillation to obtain purified benzene.

3. In a process for segregating benzene and toluene concentrates freed of reactive diolefins and recovering polymers derived from said reactive diolefins in a cracked naphtha fraction containing mainly unsaturated hydrocarbons with aromatic hydrocarbons, the steps which comprise contacting the naphtha fraction boiling in the range of approximately 120° F. to 420° F. and essentially including the benzene and toluene in liquid phase with clay at temperatures of 250° F. to 350° F.; flowing the liquid phase naphtha hydrocarbons through the clay to carry therefrom polymers derived from the reactive diolefin components in said naphtha; passing the resulting liquid mixture of the clay-treated naphtha and polymers into a first fractional distillation zone; introducing steam at a bottom part of said distillation zone; separating overhead from the first fractional distillation zone a light naphtha distillate fraction containing the benzene and toluene; withdrawing a heavy naphtha fraction boiling above 260° F. from an intermediate part of said zone; withdrawing said polymers as bottoms product; separating water from the light naphtha distillate fraction; passing said light naphtha distillate from said first fractionation zone into a second fractionation zone; operating said second fractionation zone to distill overhead a light fraction containing hydrocarbons that boil below 165° F.; recovering from said second fractionation zone a benzene concentrate boiling in the range from 165° F. to 185° F. as an intermediate distillate fraction; and recovering a bottoms toluene fraction boiling in the range of 185° F. to 260° F. from said second fractionation zone; and subjecting said benzene concentrate to an extractive distillation to obtain purified benzene.

4. In a process for segregating benzene and toluene concentrates suitably freed of reactive diolefins for extractive distillation of said concentrates and for recovering polymers from said reactive diolefins in a cracked naphtha, which comprises contacting a fraction of the cracked naphtha boiling in the range of about 120° F. to 420° F. in liquid phase with clay at temperatures of 250° F. to 350° F. and contact time controlled to form polymers from about half the diolefin components of the naphtha fraction; passing the clay-treated naphtha hydrocarbons and the polymers into a first fractional distillation zone; distilling a light fraction having a final boiling point of about 260° F. containing benzene and toluene with steam from said distillation zone; separating the distilled hydrocarbons from water in the distillate of said distillation zone; passing the separated hydrocarbon distillate into a second fractional distillation zone; withdrawing from said second distillation zone an overhead boiling below 165° F., an intermediate cut containing benzene boiling between 165° F.–185° F. and a bottoms residue boiling from about 185° F. to about 260° F. containing the toluene substantially free of benzene and free of water; passing said bottoms residue in liquid phase through a second bed of clay at 250° F. to 350° F.; and distilling a toluene concentrate boiling in the range of 185° F. to 240° F. from effluent liquid containing polymers removed from the second clay bed.

References Cited in the file of this patent

UNITED STATES PATENTS

| 2,142,075 | Rubin | Dec. 27, 1938 |
| 2,232,761 | Balthis | Feb. 25, 1941 |
| 2,366,570 | Souders et al. | Jan. 2, 1945 |
| 2,375,464 | Borden | May 8, 1945 |
| 2,400,355 | Jones et al. | May 14, 1946 |
| 2,678,957 | Fontana et al. | May 18, 1954 |